No. 679,293. Patented July 30, 1901.
W. BUTTLER.
MANUFACTURE OF WINDOW GLASS.
(Application filed Dec. 15, 1899.)
(No Model.)
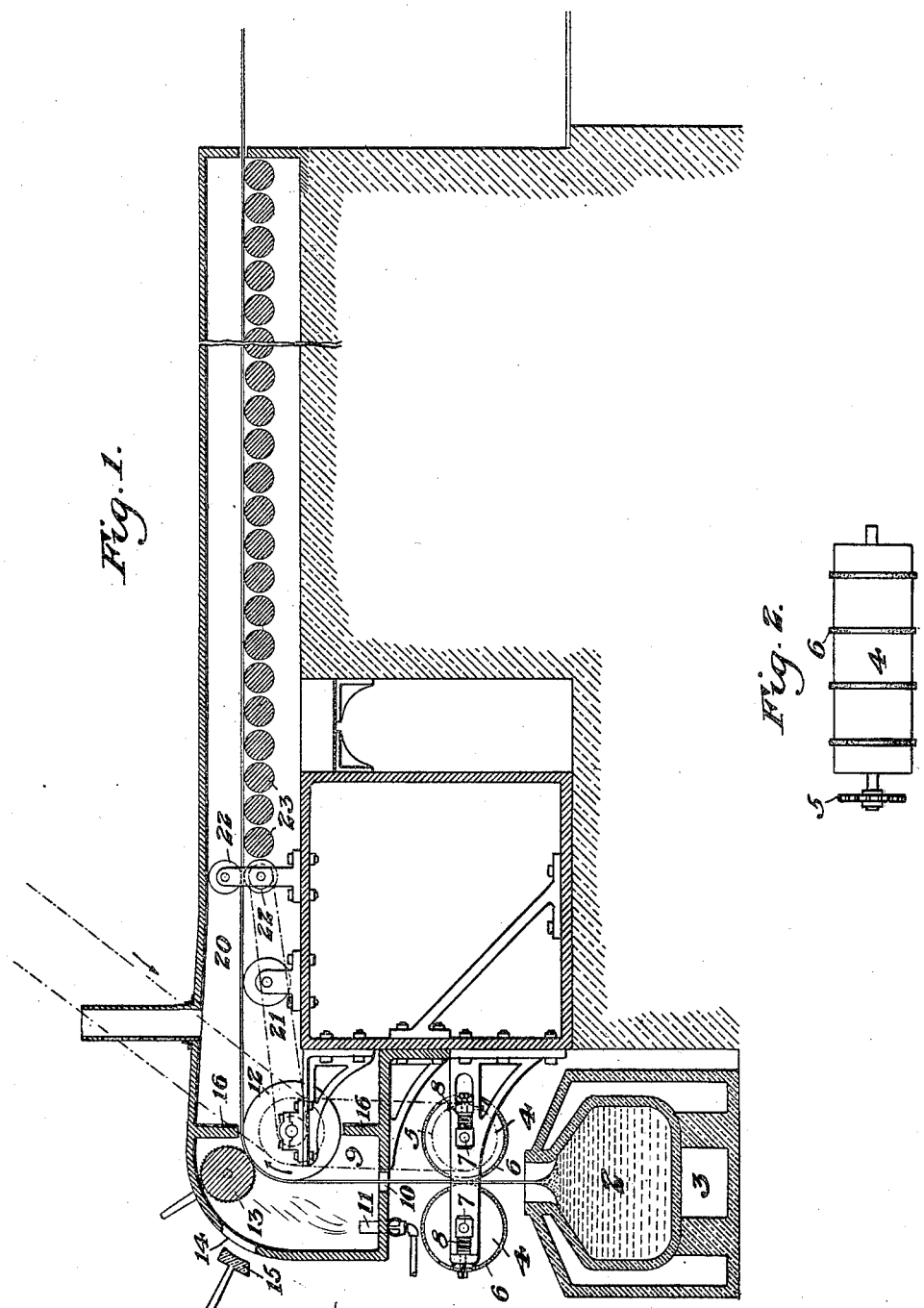
WITNESSES
INVENTOR

UNITED STATES PATENT OFFICE.

WILLIAM BUTTLER, OF REDKEY, INDIANA.

MANUFACTURE OF WINDOW-GLASS.

SPECIFICATION forming part of Letters Patent No. 679,293, dated July 30, 1901.

Application filed December 15, 1899. Serial No. 740,389. (No model.)

*To all whom it may concern:*

Be it known that I, WILLIAM BUTTLER, of Redkey, in the county of Jay and State of Indiana, have invented a new and useful Improvement in the Manufacture of Window-Glass, of which the following is a full, clear, and exact description.

My invention relates to an improvement in the manufacture of sheet-glass; and it consists in an improved method of drawing a sheet of glass from a receptacle containing the glass in a molten state, reheating the glass and flattening the sheet, and then causing the sheet to pass through the leer by a continuous operation, as is hereinafter more fully described.

I will now describe my invention so that others skilled in the art to which it appertains may use the same, reference being had to the accompanying drawings, forming part of this specification, in which—

Figure 1 is a longitudinal vertical sectional view of apparatus adapted to be used in connection with my improved method, and Fig. 2 is a detached view of one of the feed-rolls.

Like numerals of reference indicate like parts wherever they occur.

In the drawings, 2 represents a tank arranged in a suitable furnace 3, in which tank the glass is held in a molten condition. The mouth of this tank should be at least as long as the width of the sheet of glass to be drawn therefrom. Situate directly above the mouth of the tank is a pair of feed-rolls 4, which are more clearly shown by Fig. 2, which feed-rolls are driven by sprocket-wheels 5, and the face of the rolls is provided with belts 6 of asbestos, which will bind upon the glass without scratching or marring the same. These rolls are mounted in movable bearings 7 and are held in position by the springs 8, which afford a yielding pressure on the glass and allow the rolls to give should a lump in the glass pass between the same. Above the rolls 4 is a heating-chamber 9, having an opening 10 directly above the meeting faces of the rolls 4 and one or more burners 11 or other heating device. Within the heating-chamber 9 is a flattening-roll 12, above which is a flattening-roll 13, which is mounted on movable bearings. The face of this roll 13 may be figured to form a figured, rough, or ondoyant surface on the glass. Opposite the meeting faces of these rolls is an opening 14 in the walls of the heating-chamber through which a flattening-block 15 may be inserted. Above and below the flattening-roll 12 is a partition 16, which separates the heating-chamber 9 from the leer 20, whereby the heat is retained in the heating-chamber and the flattening-roll is half in the hotter heating-chamber and half in the cooler leer. Inside of the leer is a supporting-roll 21 and feed-rolls 22, which are adapted to feed the glass to the carrying-rolls 23 of the leer mechanism. The feed-rolls, flattening-roll, and carrying-rolls may be driven by any suitable driving-gear. The flattening-roll 12 may be composed of a mixture of plaster-of-paris, plumbago, and gas-carbon, or of clay or other refractory material.

In the manufacture of glass by my method a bait of the length of the width of the sheet of glass to be produced is suspended and dropped into the mouth of the tank 2, and it is then drawn out of the mouth of the tank, followed by the adhering sheet of glass, which is passed between the feed-rolls 4. As the glass is fed upwardly by the rolls 4 a continuous sheet of glass is drawn from the tank, which sheet retains its shape and form through the cooling of the glass as it passes to and from the rolls. After passing the feed-rolls 4 the sheet of glass enters the chamber 9, where it is subjected to the heat produced by the burners 11, and its temperature is raised, so as to bring the sheet to a red heat, which restores it to its semiplastic condition—that is, to a condition of plasticity that will enable the glass to be flattened on the flattening-roll 12. As the sheet of glass reaches the roll 12 it may be flattened by a flattening-block 15 and guided between the rolls 12 and 13, the roll 13 having a plain flattening-face where a smooth glass is desired or a rough face where it is desired to produce rough or figured glass. The rolls 12 and 13 not only flatten and figure the sheet of glass in the heating-chamber 9, but bend the sheet of glass, and thereby bend or change the course of travel of the sheet, whereby the continuous sheet of glass is caused to pass horizontally into the annealing-leer 20.

By my method the glass is drawn into a sheet sufficiently low in temperature to assume and retain its shape as a sheet of glass, is reheated, flattened, and passed into the leer by a continuous operation and without the necessity of cutting or handling the glass either in its plastic or brittle condition.

The advantages of my invention will be apparent to those skilled in the art.

Although I have shown certain apparatus by means of which my method can be carried into effect, I do not desire to limit my invention thereto. This apparatus, however, is in itself new and forms the subject-matter of a separate application for Letters Patent.

What I claim, and desire to secure by Letters Patent, is—

1. The method of manufacturing sheet-glass by a continuous operation, consisting in drawing the glass into a continuous sheet, passing the sheet first through a surrounding temperature lower than the temperature of the sheet of glass, then through a temperature greater than the temperature of the sheet of glass for softening the glass, and then flattening the continuous sheet of glass.

2. The method of manufacturing annealed sheet-glass by a continuous operation, consisting in drawing the glass into a continuous sheet, passing the sheet first through a surrounding temperature lower than the temperature of the sheet of glass, then through a temperature greater than the temperature of the sheet of glass for softening the glass, flattening the continuous sheet of glass, and annealing the sheet of glass.

3. In the manufacture of annealed sheet-glass, drawing and forming the sheet of glass, reheating the sheet of glass cooled by said drawing and forming operation, figuring the sheet of glass, and annealing the sheet of glass, the glass being subjected to these operations in the order named and in a continuous sheet.

4. In the manufacture of annealed sheet-glass, the continuous method consisting in drawing up and forming a sheet of glass, and for the purpose of softening the same reheating and thereby raising the temperature of the sheet of glass cooled by said drawing and forming operation, bending the sheet of glass from a vertical to a horizontal line of travel, and annealing the sheet of glass, the glass being subjected to these operations in the order named and in a continuous sheet.

In testimony whereof I have hereunto set my hand.

WILLIAM BUTTLER.

Witnesses:
WILLIAM A. DRAGOO,
THOS. BAELER.